US008798323B2

(12) United States Patent
Soderstrom

(10) Patent No.: US 8,798,323 B2
(45) Date of Patent: Aug. 5, 2014

(54) MOBILE IMAGING DEVICE AS NAVIGATOR

(75) Inventor: Gustav Soderstrom, Bromma (SE)

(73) Assignee: Yahoo! Inc, Sunnyvale, CA (US)

( * ) Notice: Subject to any disclaimer, the term of this patent is extended or adjusted under 35 U.S.C. 154(b) by 1 day.

(21) Appl. No.: 13/570,070

(22) Filed: Aug. 8, 2012

(65) Prior Publication Data
US 2012/0299960 A1  Nov. 29, 2012

Related U.S. Application Data

(63) Continuation of application No. 13/252,003, filed on Oct. 3, 2011, now Pat. No. 8,478,000, which is a continuation of application No. 12/143,527, filed on Jun. 20, 2008, now Pat. No. 8,098,894.

(51) Int. Cl.
G06K 9/00 (2006.01)
(52) U.S. Cl.
USPC .......................... 382/104; 455/456.3; 701/400
(58) Field of Classification Search
USPC ................. 382/100, 104; 345/629; 455/456.3
See application file for complete search history.

(56) References Cited

U.S. PATENT DOCUMENTS

| 5,164,992 | A | 11/1992 | Turk et al. |
| 5,933,829 | A | 8/1999 | Durst et al. |
| 5,938,721 | A | 8/1999 | Dussell et al. |
| 5,978,773 | A | 11/1999 | Hudetz et al. |
| 6,038,295 | A | 3/2000 | Mattes |
| 6,044,168 | A | 3/2000 | Tuceryan et al. |
| 6,091,957 | A | 7/2000 | Larkins et al. |
| 6,108,656 | A | 8/2000 | Durst et al. |
| 6,125,326 | A | 9/2000 | Ohmura et al. |
| 6,199,048 | B1 | 3/2001 | Hudetz et al. |
| 6,385,541 | B1 | 5/2002 | Blumberg et al. |
| 6,430,554 | B1 | 8/2002 | Rothschild |
| 6,434,561 | B1 | 8/2002 | Durst, Jr. et al. |

(Continued)

FOREIGN PATENT DOCUMENTS

| JP | 2002-183186 A | 6/2002 |
| JP | 2003-319388 A | 11/2003 |

(Continued)

OTHER PUBLICATIONS

Official Communication in U.S. Appl. No. 12/127,577 mailed Aug. 20, 2012.

(Continued)

Primary Examiner — Shefali Goradia
(74) Attorney, Agent, or Firm — James J. DeCarlo; Greenberg Traurig, LLP

(57) ABSTRACT

Embodiments of the invention are directed to obtaining information based on directional orientation of a mobile imaging device, such as a camera phone. Visual information is gathered by the camera and used to determine a directional orientation of the camera, to search for content based on the direction, to manipulate 3D virtual images of a surrounding area, and to otherwise use the directional information. Direction and motion can be determined by analyzing a sequence of images. Distance from a current location, inputted search parameters, and other criteria can be used to expand or filter content that is tagged with such criteria. Search results with distance indicators can be overlaid on a map or a camera feed. Various content can be displayed for a current direction, or desired content, such as a business location, can be displayed only when the camera is oriented toward the desired content.

20 Claims, 4 Drawing Sheets

(56) References Cited

U.S. PATENT DOCUMENTS

| | | | |
|---|---|---|---|
| 6,542,933 | B1 | 4/2003 | Durst, Jr. et al. |
| 6,651,053 | B1 | 11/2003 | Rothschild |
| 6,675,165 | B1 | 1/2004 | Rothschild |
| 6,766,363 | B1 | 7/2004 | Rothschild |
| 6,865,608 | B2 | 3/2005 | Hunter |
| 6,983,478 | B1 | 1/2006 | Grauch et al. |
| 6,993,573 | B2 | 1/2006 | Hunter |
| 7,133,555 | B2 | 11/2006 | Acharya et al. |
| 7,362,886 | B2 | 4/2008 | Rowe et al. |
| 7,457,705 | B2 | 11/2008 | Takahashi et al. |
| 7,523,132 | B2 | 4/2009 | Altounian et al. |
| 7,535,492 | B2 | 5/2009 | Kahn et al. |
| 7,565,139 | B2 | 7/2009 | Neven, Sr. et al. |
| 7,620,026 | B2 * | 11/2009 | Anschutz et al. ............. 370/338 |
| 7,627,152 | B2 | 12/2009 | Mathew et al. |
| 7,860,854 | B2 | 12/2010 | Lipson et al. |
| 8,406,531 | B2 * | 3/2013 | Ramanujapuram et al. .. 382/209 |
| 2001/0026631 | A1 | 10/2001 | Slocum et al. |
| 2001/0036224 | A1 | 11/2001 | Demello et al. |
| 2002/0019819 | A1 | 2/2002 | Sekiguchi et al. |
| 2002/0072815 | A1 | 6/2002 | McDonough et al. |
| 2002/0101539 | A1 | 8/2002 | Yokota |
| 2002/0147029 | A1 | 10/2002 | Wu |
| 2004/0100652 | A1 | 5/2004 | Cooper |
| 2005/0004749 | A1 | 1/2005 | Park |
| 2005/0162523 | A1 | 7/2005 | Darrell et al. |
| 2005/0185060 | A1 | 8/2005 | Neven |
| 2006/0012677 | A1 | 1/2006 | Neven et al. |
| 2006/0155466 | A1 | 7/2006 | Kanda et al. |
| 2006/0164382 | A1 | 7/2006 | Kulas et al. |
| 2006/0240862 | A1 * | 10/2006 | Neven et al. ............... 455/550.1 |
| 2006/0242565 | A1 | 10/2006 | Makela |
| 2007/0088497 | A1 | 4/2007 | Jung |
| 2007/0159522 | A1 | 7/2007 | Neven |
| 2007/0298766 | A1 | 12/2007 | Fan et al. |
| 2008/0019564 | A1 | 1/2008 | Murata et al. |
| 2008/0089288 | A1 | 4/2008 | Anschutz et al. |
| 2008/0104649 | A1 | 5/2008 | Naaman et al. |
| 2008/0200153 | A1 | 8/2008 | Fitzpatrick et al. |
| 2009/0083232 | A1 | 3/2009 | Ives et al. |
| 2009/0285492 | A1 | 11/2009 | Ramanujapuram et al. |
| 2009/0299961 | A1 | 12/2009 | Lo |
| 2009/0316951 | A1 | 12/2009 | Soderstrom |
| 2010/0309226 | A1 | 12/2010 | Quack et al. |
| 2011/0123120 | A1 * | 5/2011 | Quack ........................... 382/197 |
| 2012/0020522 | A1 | 1/2012 | Soderstrom |
| 2012/0191755 | A1 | 7/2012 | Naaman et al. |

FOREIGN PATENT DOCUMENTS

| | | |
|---|---|---|
| JP | 2005134352 A | 5/2005 |
| JP | 2005-202397 A | 7/2005 |
| JP | 2006023193 A | 1/2006 |
| JP | 2006059136 A | 3/2006 |
| JP | WO2006043319 A1 | 4/2006 |
| KR | 1020050013445 | 2/2005 |
| KR | 10-2005-0078136 A | 8/2005 |
| TW | I269024 B | 12/2006 |
| WO | 2008-040004 A2 | 4/2008 |
| WO | 2008-068849 A1 | 6/2008 |

OTHER PUBLICATIONS

Official Communication in Japanese Application No. 2011-514663 mailed Aug. 30, 2012.
Fockler et al., "PhoneGuide: Museum Guidance Supported by On-Device Object Recognition on Mobile Phones," Bauhaus University Weimar, MUM 2005, Christchurch, New Zealand, pp. 3-10.
Dao et al., "Location-Based Services: Technical and Business Issues," GPS Solutions, 2002, pp. 169-178.
International Search Report and Written Opinion for International Patent Application No. PCT/US2009/041146, mailed Dec. 2, 2009.
Qode Patents, Neomedia Technologies, Inc., 4 pages http://www.paperclick.com accessed Feb. 8, 2008.
Amazon Japan Offers Barcode Purchases via Camera Phone, Slashdot, 7 pages http://slashdot.org/article.pl?sid=04/11/24/0545244 accessed Feb. 8, 2008.
Lowe, D. G., "Object Recognition from Local Scale-Invariant Features," Procedures of the International Conference on Computer Vision, Corfu, Sep. 1999, 8 pages.
Lienhart, R., "Video OCR: A survey and Practitioner's Guide," in Video Mining, Kluwer Academic Publisher, Oct. 2003, pp. 155-184.
Bruns, E. et al., "Enabling Mobile Phones to Support Large-Scale Museum Guidance," IEEE Computer Society, Apr.-Jun. 2007, 10 pages.
Mosquitos Augmented Reality Game, 2 pages http://www.ojom.com/index.php?id=47 accessed Feb. 13, 2008.
Attack of the Killer Virus Augmented Reality Game, 4 pages http://www.ojom.com/index.php?id=46 accessed Feb. 13, 2008.
Action Twister Augmented Reality Game, 3 pages http://www.ojom.com/index.php?id=48 accessed Feb. 13, 2008.
International Search Report and Written Opinion for International Patent Application No. PCT/US2009/044592, mailed on Jun. 11, 2010.
Office Communication for U.S. Appl. No. 12/121,259 mailed Aug. 3, 2011.
Office Communication for U.S. Appl. No. 12/143,527 mailed Jun. 28, 2011.
Goldwasser, D., "A Brief Introduction to GPS Photo Linking," Jun. 15, 2004, pp. 1-5 http://www.macdevcenter.com/lpt/a/4941.
Bishop, T., "Microsoft Notebook: Research team blends digital images and GPS," Feb. 16, 2004, pp. 1-3 http://seattlepi.nwsource/business/160723__msftnotebook16.html.
Klika, "TripTracker.net," Aug. 11, 2006, pp. 1-2 http://triptracker.net/about/.
Early, J., "GPS Photo Linker," Aug. 11, 2006, pp. 1-2, and photo http://oregonstate.edu/~earlyj/gpsphotolinker/index.php http://oregonstate.edu/~earlyj/gpsphotolinker/images/match__mode130.jpg.
Microsoft Corporation, "Welcome to the World-Wide Media eXchange!," Apr. 7, 2005, pp. 1-2 http://wwmx.org.
Microsoft Corporation, "World-Wide Media eXchange: FAQ," Apr. 7, 2005, pp. 1-2 http://wwmx.org/FAQ.aspx.
Sony Electronics, Inc., "Organize Photos by 'Where' not 'When' with Global Positioning System for Sony Digital Cameras," Aug. 1, 2006, pp. 1-2 and photo http://news.sel.sony.com/en/press__room/consumer/digital__imaging/release/23993.html http://news.sel.sony.com/images/large/consumer/digital__imaging/map__image04__lg.jpg.
Wallace, M., "Automatically Geotag Your Digital Photos," Aug. 3, 2006, pp. 1-2 http://www.unmediated.org/archives/2006/08/automatically__g.php.
Official Communication for U.S. Appl. No. 11/555,249 mailed Jun. 10, 2009.
Official Communication for U.S. Appl. No. 11/555,249 mailed Dec. 29, 2009.
Official Communication for U.S. Appl. No. 11/555,249 mailed Mar. 9, 2010.
Official Communication for U.S. Appl. No. 11/555,249 mailed Jul. 6, 2010.
Official Communication for U.S. Appl. No. 11/555,249 mailed Oct. 26, 2010.
Official Communication for U.S. Appl. No. 11/555,249 mailed Apr. 12, 2011.
Official Communication for U.S. Appl. No. 11/555,249 mailed Sep. 16, 2011.
Official Communication for U.S. Appl. No. 11/555,249 mailed Feb. 2, 2012.
Official Communication for Chinese Patent Application No. 200980123321.8 issued Jun. 1, 2012.
Official Communication for Chinese Patent Application No. 200980123321.8 issued Oct. 10, 2011.
Official Communication for Korean Patent Application No. 10-2011-7001509 issued Jan. 31, 2012.
Official Communication for Korean Patent Application No. 10-2010-7028223 issued Feb. 6, 2012.

(56) References Cited

OTHER PUBLICATIONS

Official Communication for U.S. Appl. No. 12/121,259 mailed Jan. 13, 2012.
Official Communication for U.S. Appl. No. 12/121,259 mailed Apr. 12, 2012.
Official Communication for U.S. Appl. No. 12/127,577 mailed Feb. 7, 2012.
Shlens, J., "A Tutorial on Principal Component Analysis," Systems Neurobiology Laboratory, Salk Institute for Biological Studies, Dec. 10, 2005.
Turk, M. et al., "Eigenfaces for Recognition," Journal of Cognitive Neuroscience, 3:1, 1981.
Pissarenko, D. "Eigenface-based Facial Recognition," printed May 23, 2008 http://openbio.sourceforge.net/resources/eigenfaces/eigenfaces-html/facesOptions.html.
Official Communication for U.S. Appl. No. 12/143,527 mailed Oct. 20, 2011.
Official Communication for U.S. Appl. No. 12/127,577 mailed Jul. 26, 2011.
Official Communication for U.S. Appl. No. 13/252,003 mailed May 1, 2012.
Official Communication in Taiwanese Patent Application No. 098114686 dated Sep. 21, 2012.
Official Communication in Japanese Patent Application No. 2011-509529 mailed Oct. 25, 2012.
Official Communication in U.S. Appl. No. 13/252,003 mailed Nov. 2, 2012.
Official Communication in U.S. Appl. No. 13/252,003 mailed Oct. 9, 2012.
Official Communication in U.S. Appl. No. 12/121,259 mailed Oct. 17, 2012.

\* cited by examiner

MOBILE IMAGING DEVICE AS NAVIGATOR

CROSS-REFERENCE TO RELATED APPLICATIONS

The present application is a Continuation Patent Application of U.S. patent application Ser. No. 13/252,003, filed on Oct. 3, 2011, which is a Continuation Patent Application of U.S. patent application Ser. No. 12/143,527 entitled "Mobile Imaging Device As Navigator," filed on Jun. 20, 2008, the benefit of the earlier filing date of which is hereby claimed under 35 U.S.C. §120 and which is further incorporated herein by reference in its entirety.

FIELD OF ART

The present invention is directed to obtaining information based on orientation of a mobile imaging device, and more particularly, to enabling a user to orient directionally in real and/or virtual worlds by orienting the mobile imaging device to capture visual cues for directional guidance.

BACKGROUND

Three-dimensional (3D) vector maps are used in global positioning system (GPS) mapping systems such as those by TomTom International BV and Garmin Ltd. Such maps may give a perspective view of a locality from an overhead "birds-eye" view or from a ground-level view. A perspective view enables a user to gauge how far away one might be from a location. Existing GPS vector map systems often come pre-programmed with certain local destinations, such as restaurants and coffee shops. A driver can automatically scroll through these maps as a function of linear motion through space as tracked by GPS, but map information is generally based on the direction of motion. Also, the scale of this linear motion, and the corresponding navigation on the map, is typically tuned for driving rather than foot movement.

Similarly, current mobile search systems, such as those used by personal data assistants (PDAs), typically use a 2D birdseye map view to display local results in a radius around a current location of the mobile device, rather than in a direction that a user is facing. Thus, current 2D and 3D mapping systems generally provide search information in a direction of travel, or in a radius about a location. But these systems generally can not determine an orientation in which a driver or user is facing. For example, a car may move in reverse, but the driver may be facing forward or sideways. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF EMBODIMENTS

Figure 1:
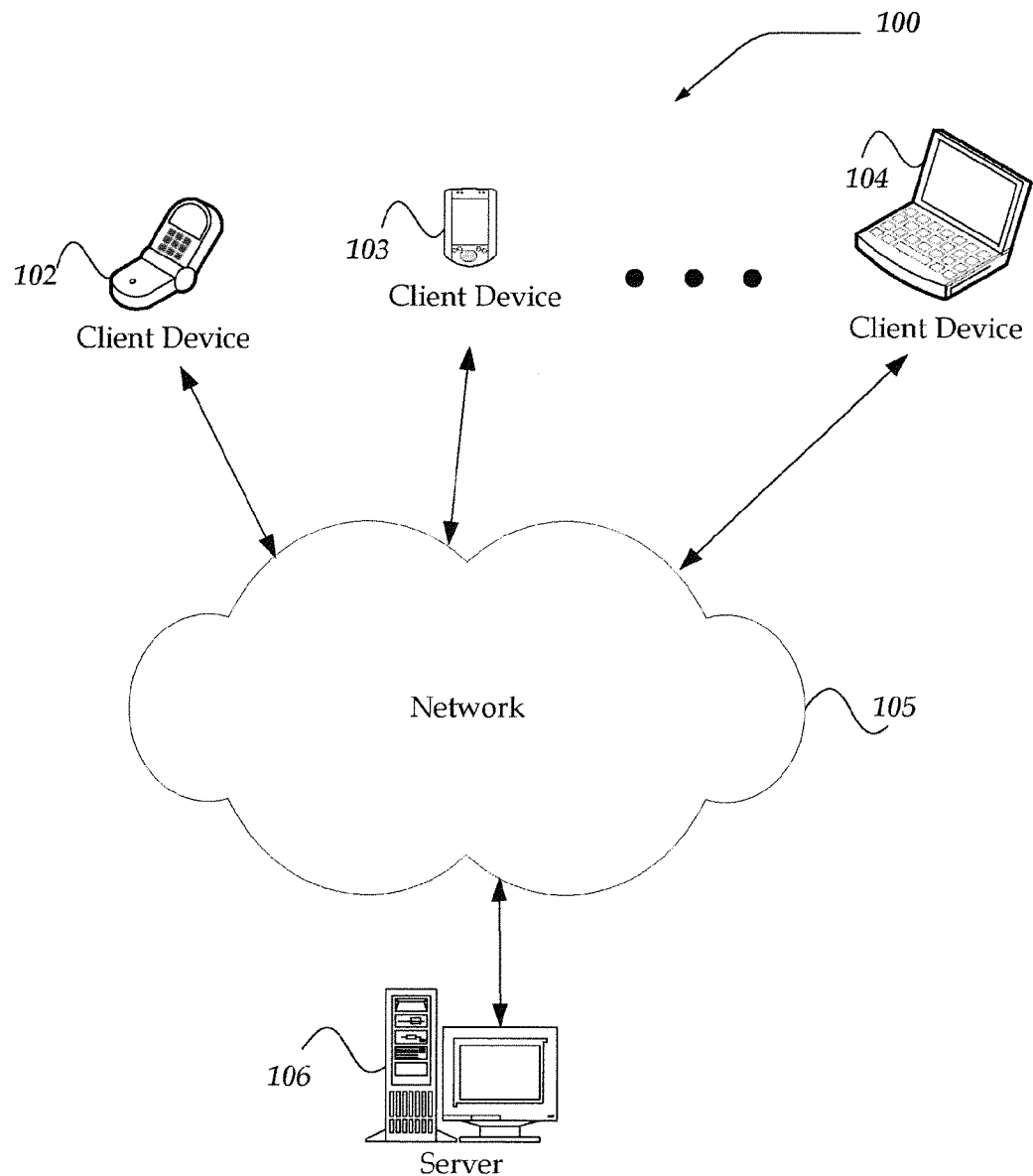
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different foams and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, embodiments of the invention are directed to obtaining information based on directional orientation of a mobile imaging device. Embodiments enable users to directionally orient themselves by orienting the mobile imaging device to capture visual cues for directional guidance. The visual clues are used to determine a directional orientation of the mobile device, perform searches based on the orientation, perform orientational manipulation of three-dimensional virtual worlds, and the like. Directional orientation information may also be combined with distance information to expand or filter information.

In one embodiment, a mobile map application is used with a cell phone handset camera for improving user navigation and finding identified locations of interest. A handset camera is used for tracking orientational motion and small scale linear motion. Once, a user's location has been pinpointed (e.g., via GPS, by user input, or the like), the user can gather information on directional orientation by turning in a circle and having the handset camera capture visual/optical cues, such as intersections, store fronts, signs, etc. The visual clues are associated with predefined information of a 3D vector map for directional guidance. In another embodiment, optical input from the handset camera (e.g., tracking patterns in the background to discern speed and direction of the handset camera) is used to dynamically navigate around 3D vectors maps. Predefined vector map information may be sent to the handset, so that it is easier to find identified locations. For example, streets, buildings, landmarks, or other points of interest may be several blocks away and obscured by tall buildings relative to where the user is presently situated. Similarly, local merchant information from one or more sources may also be provided on the vector map. A user may manage the various types of information, and the amount of information by indicating an orientation without requiring linear motion to identify a direction. With orientation data and multiple types of content information, embodiments of the invention enable more relevant mobile search results, mobile navigation, and other information.

Directional orientation information enables searching "infinitely" far in a direction, and each search result may be marked with a distance relative to where the user's current position. Indications of distance may be a proportionally smaller sized icon, a lower rank on a results list, a degree of transparency, or other indicator. For example, a user may be stopped at an intersection, trying to determine which way to turn to find the nearest (or a preferred company's) gas station. Without having to travel down each road, and without having to scroll or change a zoom level on a virtual map, the user can simply point a mobile device in the direction of each road and receive results with distance indicators.

One embodiment also utilizes information regarding orientational motion of the mobile device. Initially, a mobile device establishes its existing physical position via GPS, user input, image analysis of a current scene, or the like. The mobile device also uses its imaging component to establish its initial orientational direction. The orientation may be determined by comparing an image with a known directional image. This comparison may be performed on an image captured and stored by the mobile device, on an image in a viewfinder that is superimposed with an outline of a known object, on a combination of images, or using other image processing techniques. Alternate, or additional techniques may include analyzing sun position relative to date and time, receiving instructions to orient the mobile device in a specified direction and clicking to confirm, analyzing text or symbols on signs at known locations, or the like.

Once an initial orientation is established, some embodiments involve detecting a change in orientation and/or detecting a new orientation after motion. For example, the mobile device may detect a new direction in which the device is pointing during, or after the device is moved in a circle around the user. At the initial orientation, during the motion, and/or at the new orientation, the mobile device performs may display and move a map based on the orientations and change in orientation. The mobile device may also perform one or more content searches or otherwise obtains content information regarding points of interest in the direction(s) that the mobile device is pointed. The content information may be superimposed on the displayed map, and may move and/or change based on the orientations and change in orientation. Additional detail of example embodiments is described below with regard to the figures.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, and a server 106. Network 105 is in communication with and enables communication between each of client devices 102-104, and server 106.

Client devices 102-104 may include virtually any computing device capable of receiving and sending a message over a network, such as network 105, to and from another computing device, such as content server 106, each other, and the like. The set of such devices may include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a personal digital assistant (PDA), pocket PC, wearable computer, and any other device that is equipped to communicate over a wired and/or wireless communication medium. The set of such devices may also include devices that typically connect using a wired communications medium such as personal computers, multiprocessor systems, microprocessor-based or programmable consumer electronics, network PCs, and the like.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 105 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 105 includes any communication method by which information may travel between client devices 102-104, and/or server 106.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Server 106 may comprise multiple computing devices or a single computing device. Server 106 may provide image analysis services, such as determining histograms, performing OCR, comparing images to previously stored images, determining information about images, performing database operations, performing searches for additional information, storing information about images, tracking user behaviors, or the like. Server 106 may also provide content and/or other services such as web sites, online journals (e.g., blogs), photos, reviews, online services such as messaging, search, news, shopping, advertising, and/or the like. Server 106 may further provide administrative services, such as creation, modification, and management of relationships between network resources, such as web pages, or the like. Briefly, server 106 may include any computing device capable of connecting to network 105 and may manage services for a network user, such as a user of at least one of client devices 102-104. Devices that may operate as server 106 include dedicated server devices, personal computers, desktop computers, multiprocessor systems, microprocessor-based or programmable consumer electronics, network PCs, and the like. Server 106 and/or any of clients 102-104 may be implemented on one or more computing devices, such as a client described with regard to FIG. 2.

Illustrative Client Device

Figure 2:
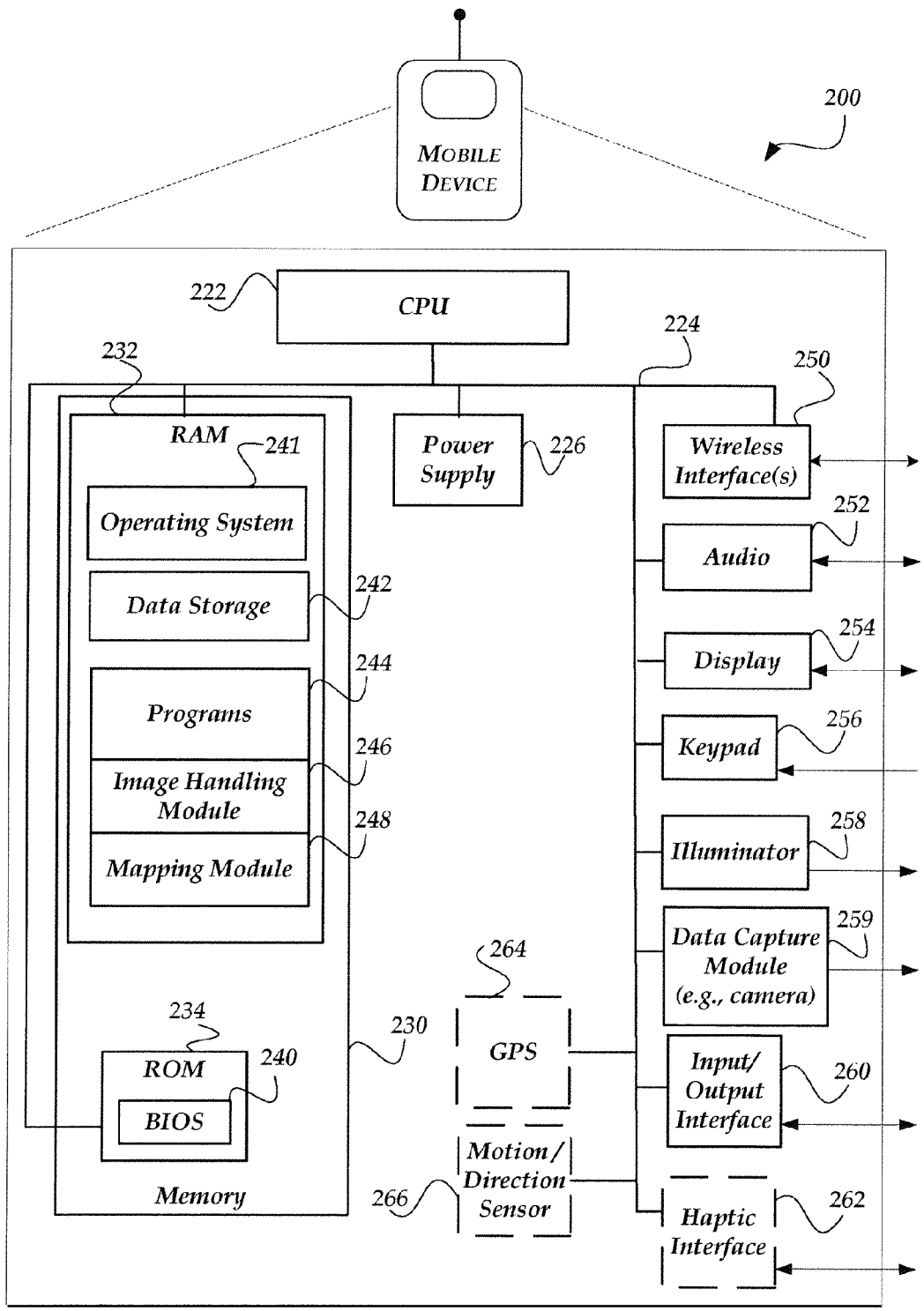
FIG. 2 shows a schematic diagram of one embodiment of an exemplary mobile device.

FIG. 2 shows an exemplary client device 200, according to one embodiment of the invention for use as a reference data collector device. In one embodiment, client device 200 is a mobile device, such as a laptop computer. Another example of a mobile device includes a PDA or a cellular telephone that is arranged to send and receive voice communications and messages such as SMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, client device 200 may comprise any mobile or stationary electronic device. Such devices include laptops, palmtops, PDAs, handheld computers, cellular telephones, smart phones, pagers, radio frequency (RF) devices, infrared (IR) devices, integrated devices combining one or more of the preceding devices, and the like. Client device 200 may also comprise other electronic devices such as personal computers, multiprocessor systems, microprocessor-based or programmable consumer electronics, network PCs, wearable computers, and the like.

Client device 200 may include many more, or fewer, components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by client device 200 to store, among other things, programs 244 and/or other data. Programs 244 may include computer executable instructions which, when executed by client device 200, transmit, receive, render, and/or otherwise process markup pages such as HTML pages, XML pages, WAP pages (sometimes referred to as WAP cards), and the like. Accordingly, programs 244 may include a browser program of computer executable instructions, which may be run under control of operating system 241 to enable and manage requesting, receiving, and rendering markup pages and messages (e.g., HTTP, TCP/IP, SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth.

In addition, mass memory 230 stores an image handling module 246 and a mapping module 248, which may be run as external modules under control of operating system 241, as plug-in modules within a browser, within a web page, or via another configuration. Image handling module 246 may perform initial processing or complete processing of image data, context information, user requests for image data, and other data related to images acquired or received by the mobile device. Mapping module 248 may manage map information for display, perspective, motion, integration with images or content, and other map operations.

Client device 200 also includes a power supply 226, one or more wireless interfaces 250, an audio interface 252, a display 254, a keypad 256, an illuminator 258, an optional data capture module 259, an input/output interface 260, an optional haptic interface 262, an optional global positioning systems (GPS) receiver 264, and an optional sensor that senses motion, direction, and/or orientation of the client device. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station, or directly with another client device. Wireless interface 250 includes circuitry for coupling client device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 252 is arranged to produce and/or receive audio signals such as the sound of a human voice, music, and the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a client device. Display 254 may also include a touch sensitive screen arranged to receive input from an object such as a stylus or a digit from a human hand.

Keypad 256 may comprise any input device arranged to receive input from a user. For example, keypad 256 may include a keyboard, a push button numeric dial, or the like. Keypad 256 may also include command buttons that are associated with selecting and performing changeable processes. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the mobile device to illuminate in response to actions. Illuminator 258 may further be used as a flash for image capture. A data capture module 259, such as a camera, may be included in client device 200. The client device may obtain images, video, temperature, pressure, or other data.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Optional haptic interface 262 is arranged to provide tactile feedback to a user of the client device. For example, the haptic interface may be employed to vibrate client device 200 in a particular way when another user of a client device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Optional sensor 266 can detect a direction, orientation, motion, or other aspect of the mobile device. The sensor may read static information or dynamic information, such as a change to any aspect of the mobile device. Sensor 266 may comprise an accelerometer, a gyroscope, a compass, or other sensor that detects motion, direction, or the like. The sensor may include, or be coupled to transducing components, signal processing components, and/or other components.

Illustrative Network Device

Figure 3:
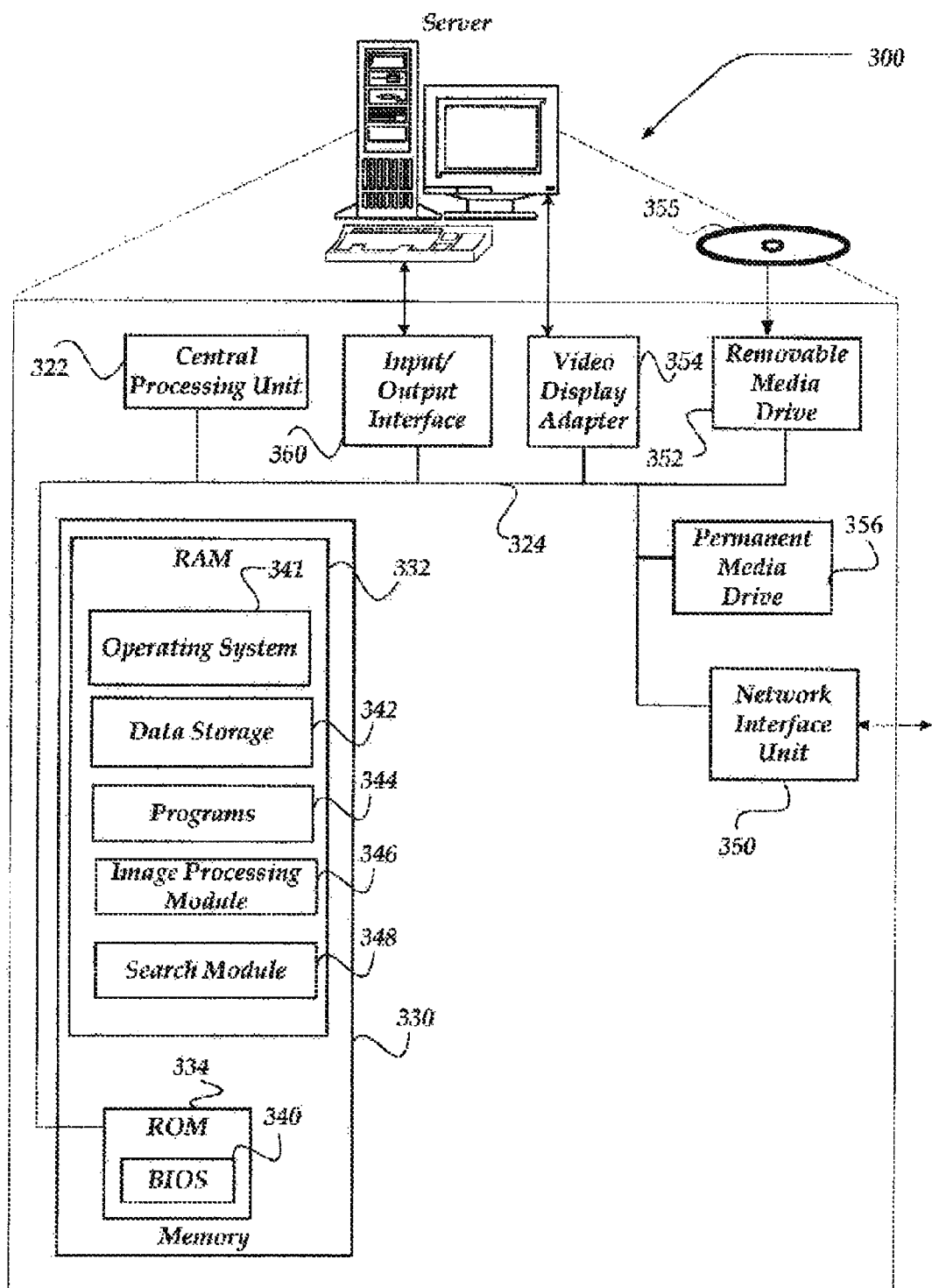
FIG. 3 illustrates a schematic diagram of one embodiment of an exemplary network device.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, server 106 or another client device of FIG. 1. For example purposes, network device 300 will be described as a server device.

As shown in the figure, server device 300 includes a processing unit 322 in communication with a mass memory 330 via a bus 324. Mass memory 330 generally includes a RAM 332, a ROM 334, and other storage means. Mass memory 330 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 330 stores a basic input/output system ("BIOS") 340 for controlling low-level operation of server device 300. The mass memory also stores an operating system 341 for controlling the operation of server device 300. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 330 further includes one or more data storage units 342, which can be utilized by server device 300 to store, among other things, programs 344 and/or other data. Programs 344 may include computer executable instructions which can be executed by server device 300 to implement a markup handler application, such as an HTTP handler application for transmitting, receiving, and otherwise processing HTTP communications, a WAP handler application for transmitting, receiving, and otherwise processing WAP communications, and the like. Similarly, programs 344 can include a secure socket layer (SSL) handler application for handling secure connections, such as initiating communication with an external application in a secure fashion. Other examples of application programs include content management applications, messaging applications, schedulers, calendars, web services, transcoders, database programs, word processing programs, spreadsheet programs, and so forth. Accordingly, programs 344 can process images, audio, video, or markup pages, enable telecommunication with another user of another electronic device, and/or other services.

In addition, mass memory 330 stores an image processing module 346. Image processing module 346 may include computer executable instructions, which may be run under control of operating system 341 to analyze images, compare images, determine context information, access information associated with a location, evaluate user behavior data, determined search terms, or perform other processes related to images. In one embodiment, image processing module 346 generally communicates with an image handling module on a client device. Mass memory 330 may also include a search module 348, which may be part of, or in communication with image processing module 346. Search module 348 may comprise a search engine that generally performs data searches, such as content searches, searches for links to network resources, database searches, or the like.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, programs 344, and/or other modules. Interaction with the user interface includes visual interaction via a display, and a video display adapter 354.

Server device 300 may include a removable media drive 352 and/or a permanent media drive 356 for computer-readable storage media. Removable media drive 352 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as network 105 in FIG. 1. Network communication interface unit 350 is sometimes known as a transceiver, transceiving device, network interface card (NIC), and the like.

Illustrative Logic

Figure 4:
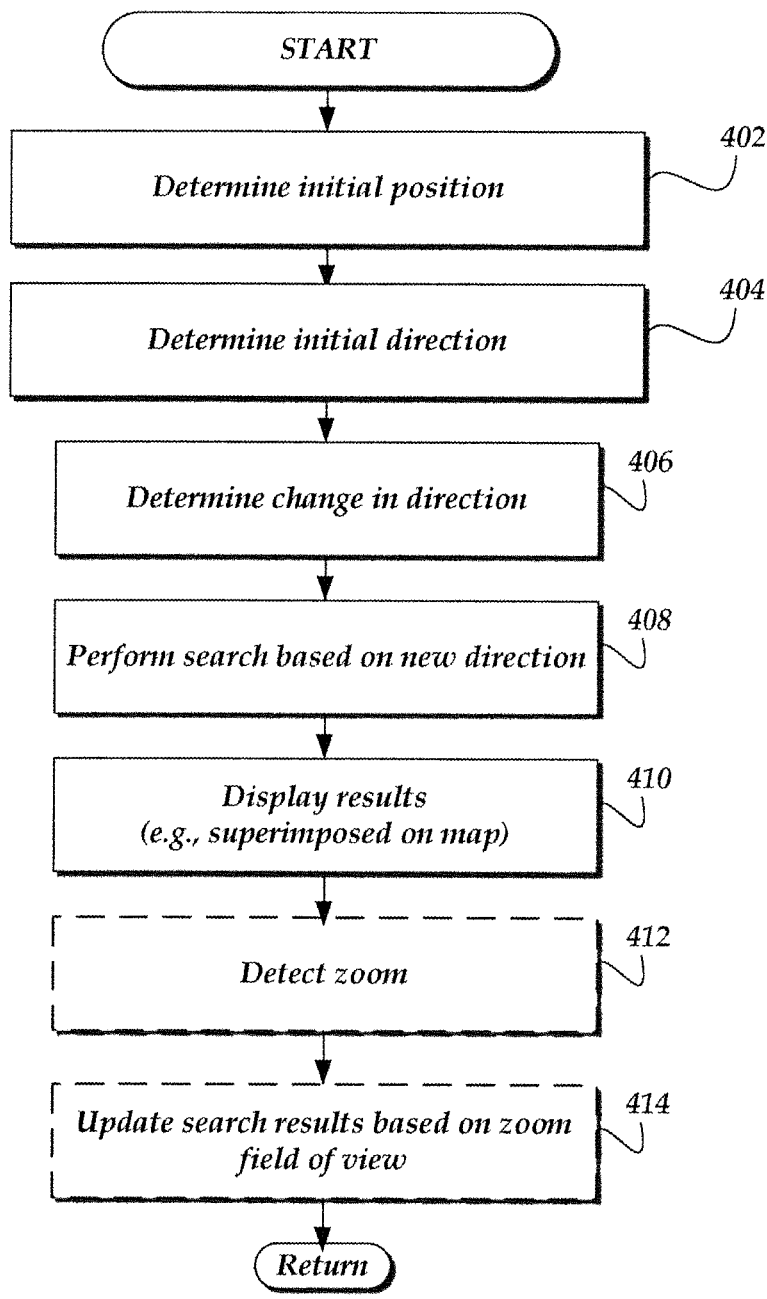
FIG. 4 illustrates a flow chart of example logic for determining search results based on a direction in which the mobile device is pointed.

FIG. 4 illustrates a flow chart of example logic for determining search results based on a direction in which the mobile device is pointed. In this example embodiment, processing is primarily performed on a client mobile device. But at least some operations may be performed with a server device over a network.

At an operation 402, the current physical geographic position of the mobile device is determined. The current location can be established by a built-in GPS component, a radio frequency identification (RFID) tag or reader at a known location, or other position component. Alternatively, the user may tap, click, or otherwise indicate a point on a displayed map, which can return a latitude, longitude, altitude, street address, tax parcel number, or other location information. As another alternative, the user may simple input location information, such as an address, an intersection, a building name, a landmark name, or other location information.

In another embodiment, a camera of the mobile device can capture an image, which is then analyzed relative to known location information. For example, the camera may capture an image of a street sign, a billboard, a store front, a building, or other scene. Text, symbols, landmarks, or other information may be analyzed from the image to determine a location. Further details of image analysis and location detection are described in co-owned U.S. patent application Ser. No. 12/121,259, filed on May 22, 2008, and titled "Data Access Based On Content Of Image Recorded By A Mobile Device," the entire contents of which are hereby incorporated by reference.

At an operation 404, the mobile device is used to establish an initial orientational direction in which the mobile device is pointing. This initial direction can be established in a number of ways, and may be used to synchronize the mobile device with a mapping module or other service. For example, based on the determined initial position, the mobile device may display a message instructing the user to point the mobile device along a known street, toward a known physical object, toward a known compass direction, or other direction that a user can easily identify. The mobile device can also display a 2D or 3D map of the area around the determined initial position, and the map can display an arrow, a highlighted icon, or other indicator of the street, object, or other directional item at which the mobile device instructed the user to point the mobile device. This displayed map may help the user orient the mobile device to point in the instructed direction. The mobile device may further instruct the user to press a button on the mobile device, indicating that the user has oriented the mobile device as instructed.

In another embodiment, the mobile device may use a 3D first person perspective map of the area around the initial determined position. More specifically, the 3D map may show a 3D graphic scene of buildings, terrain, or other rendered objects to which the user should point the mobile device. The 3D graphic scene may be shown as a semi-transparent or outline overlay to the camera feed of the mobile device. As the user moves the camera lens of the mobile device to different directions, the user can "recognize" when the image in the camera finder "matches" the 3D map shown. Similarly, the mobile device may continuously scan the camera feed and perform continuous image recognition for certain patterns, compared to a 3D perspective overlay. If a match is detected, the mobile device can automatically discern when the user is pointing the camera lens in the right direction.

In a further embodiment, the mobile device may use the GPS module to detect that the device is moving in a certain direction, and instruct the user to point the mobile device in the direction that the user is traveling (e.g., by car, by public transportation, by walking, etc.). Again, the mobile device may instruct the user to press a button to indicate that the mobile device is oriented in the instructed direction. In yet another embodiment, the mobile device may instruct the user to point the mobile device camera lens in the direction of the sun. After the user presses a button, the mobile device can obtain information about the current time of day, and use the determined location to calculate the direction in which the mobile device is pointing. In addition, or alternatively, the mobile device may use image analysis to evaluate shadows. In a further embodiment, the mobile device may include a compass. The mobile device may read a direction from the compass when the user presses a button. The button may be a general physical button (e.g., an enter button), may be a virtual button displayed on a screen, may be a dedicated "direction" button, or other form of button.

Based on the initial direction, the mobile device can access content information relevant to the initial direction. In another embodiment, the initial direction may be used as a reference direction to determine a change in direction.

In this embodiment, at an operation 406, the mobile device determines a change in direction. For example, the mobile device may detect a new orientational direction during or after the mobile device is moved in a circle around the initial position. The mobile device may analyze each frame of multiple images taken by the mobile device during the motion, to determine a shift in the images. This shift indicates an amount and direction of motion, so the mobile device can calculate a new direction. In this embodiment, the mobile device camera continuously snaps a stream of pictures, and analyzes them for patterns, such as lines, blocks, etc. The mobile device then evaluates the movement of these patterns, so that if the user moves the mobile device in any direction (or orientation) relative to the background, the mobile device can determine the relative motion. The mobile device may also revise a map display or other displayed content by a similar amount (which may actually be in the opposite direction). The mobile device can detected the shift between successive patters, or between the first pattern of the first captured image and the last pattern of the last captured image. This gives the impression that the displayed map is fixed in space towards the physical world, while the mobile device appears to pan over this map.

In another embodiment, the mobile device may include one or more accelerometers, gyroscopes, compasses, strain gauges, or other components for detecting motion, direction, or other properties. For instance, three accelerometers may be used to detect motion in three dimensions. Motion relative to the initial direction can be used to determine a new direction.

While the mobile device is moving, or after the mobile device is held in a new direction, the mobile device obtains content information associated with the current direction, at an operation 408. The mobile device accesses content information stored on the mobile device and/or at a remote server. The mobile device may access a database or submit search requests based on the current location and direction information. The user may also enter keywords or other search parameters. For example, the user may enter an address, business name, product type, or other search term that the user may be interested in finding in the direction that the mobile device is currently pointing. The mobile device or a search server can perform the search or may filter search results based on the entered search term, current direction, and current position. Similarly, the user may enter a maximum distance, or the search system may use a default maximum distance from the current position. Results can be limited to those that are within the specified distance, or within a range around the specified distance.

The content information is tagged with geographic position information. The search system can determine a range of geographic positions relative to the current position and direction of the mobile device. The search system can then determine content that is tagged with geographic positions within the determined range. The results can be further determined based on keywords or other parameters. For example, the mobile device user may have given permission for the search system or another service to track the movement, network interactions, purchases, game activities, or other uses of the mobile device. This information may be compiled in a profile associated with the mobile device. Aggregate information may also be compiled and statistically analyzed for the behaviors of a number of other devices or users. The search system may use the profile information and/or aggregate information to further refine the search results to information that may be more relevant to the mobile device user.

In another example, in the displayed map on the mobile device, the user may have selected a tab that indicates a certain type of information, such as restaurants. A corresponding search term for the selected tab may be submitted with the position, direction, distance, and keywords to limit the results to restaurants in the current direction.

Similarly, the user may select a tab or otherwise indicate that the user desires information on other users that are currently in the direction that the mobile device is pointing. For example, users may be using a messaging system, logged into a portal service with a user ID, using a social networking system that can manage relationships of people who are separated by multiple degrees of relationships, or otherwise providing current location information that is accessible to the search system. In one instance, two users may be trying to locate each other along a street, somewhere in a building, around a very loud crowded room, or in another environment. A selected "people" tab, an entered name, an entered user ID, or other related search term can be used to limit the results to those associated with the search term, current direction, and current position. Optional presence information can also be used by the search system to determine final results. For example, a private user may indicate that they want to remain "invisible" to other users who may be pointing their mobile devices in the direction of the private user. Alternatively, a group user may indicate that they want their presence to be known only to users in the group user's a contact list.

While determining search results, the search system can also calculate distances between each search result and the current position of the searching mobile device. Similarly, the search system may calculate an offset between each search result and the current direction that the mobile device is pointing. The offset may be an angular offset, a linear offset from a direction line, or other offset.

At an operation 410, the distance information and final results are provided to the mobile device and displayed by the mobile device. The mobile device may display the search results as a simple list or in a graphical manner. For example, the mobile device may display the list in order based on distance from the current position of the mobile device. The distance may be specified next to each search result. Similarly, the mobile device may indicate an offset next to each search result. The search results may include an icon or other graphic that indicates a type of information. For example, search results for another user may be indicated by an avatar. Search results for a fuel station may be indicated by a fuel symbol. Similarly, colors, fonts, or other indicators may be used to distinguish search results.

In another embodiment, the mobile device superimposes the search results onto a graphic display. For example, the mobile device may superimpose icons, text, or other search result information onto a displayed 3D vector map. Portions of the search results may be displayed based on a user selected tab, entered keywords, predefined preferences, presence parameters, past behavior, aggregate behavior, or other filter. Some search results may not fall within the current field of the mobile device display, and may not be displayed until the view is modified or the mobile device is pointing in the corresponding physical direction of that search result. Alternatively, the actual search results may be dynamically updated as the mobile device is moved around.

In one embodiment, the results are displayed on a 3D perspective view that is simply the viewfinder feed from the mobile device camera. In another embodiment the search results are superimposed on a 3D perspective map that may appear fixed, such that the display appears to pan over the vector map as the mobile device is moved. In one embodiment, a semitransparent 3D perspective map outlines the elements such as streets, on top of a background image.

Search results that are in the close perimeter of the mobile device's current location, but are not in a current field of view, or beyond a threshold distance, can be cached for quick rendering while moving the mobile device. In addition, or alternatively, more and more search results may be displayed further and further from the current location of the device, if the device is kept still in a certain direction. Distance can also be indicated by a relative size of search result indicators to give a clearer perspective on results that are physically close and those that are not. As with a list of results, graphically displayed results may have a distance indicator next to the result icon.

A further embodiment may provide "X-Ray" search results. This embodiment can give a user the sense of having an "X-Ray" device that can see through buildings and terrain to reveal what is behind obstacles in a certain direction. For example, the results may be displayed semi-transparently, or the obstacles may be displayed semi-transparently. Corresponding icons or other results indicators may be displayed for restaurants, fuel stations, shops, user generated content, or other information. This is useful for searching for specific things when the user already knows roughly what the user is looking for, such as categories of information or a specific string.

In another example, if the user entered an address, the search system may provide search results indicating a different direction than the determined direction. In that case, the user may move the mobile device, such as in a circle about its current position, until the address result comes into view (directly or through an obstacle). For instance, a red dot may be displayed when the mobile device is moved to the direction of the entered address. This enables a user to find a direction, to proceed to the desired address.

Similarly, yet another embodiment may provide an "overlay" and "discovery" capability. This embodiment can give a user the sense of putting a digital, or virtual overlay on top of a physical place, and allow the user to discover content without looking for anything in particular. For example, user generated content like, such as location-tagged images or comments provided by other users, may be displayed around the mobile device user's current location. As the user moves the direction of the mobile device, the location-tagged images, comments, or other content may be displayed. This may be applicable for community services in general.

At an optional operation 412, the mobile device may detect that the user activated a zoom function on the mobile device. The mobile device determines a corresponding change to the field of view. In one embodiment, the change in field of view may simply be represented as an extension to the range of distance in the direction that the mobile device is pointed. In another embodiment, the change in field of view may be represented as an offset change in current position. A perspective calculation may also determine a change in angular or linear offset from the direction line.

At an optional operation 414, the display of search results may be updated to reflect the change in field of view. Alternatively, a new search may be requested, and the search results may be updated.

The above specification, examples, and data provide a complete description of the manufacture and use of the composition of the invention. For example, the search results may be provided with an audio output device, which may be useful while driving or for legally blind users. In another embodiment, a movable imaging device, such as a web camera, may be coupled to a computing device, and only the movable imaging device moves position and/or direction. Since many embodiments of the invention can be made without departing from the spirit and scope of the invention, the invention resides in the claims hereinafter appended.

What is claimed as new and desired to be protected by Letters Patent is:

1. A server device, comprising:
    one or more physical storage devices configured to store executable-instructions; and
    a central processing unit that executes the executable-instructions to perform actions, including:
        receiving a geographic position of a mobile device;
        receiving a change in an orientational direction of the mobile device from a first direction to a second direction, the orientational direction being determined at least in part using an imaging component of the mobile device;
        performing a search for content information based on the received geographic position and change in orientational direction of the mobile device; and
        providing the content information to the mobile device.

2. The server device of claim 1, wherein the central processing unit executes the executable-instructions to perform actions, further including: receiving a distance perimeter from the mobile device, usable to limit content information provided to within the distance perimeter.

3. The server device of claim 1, wherein providing the content information further comprises tagging the content information with geographic position information relative to the position and orientational direction of the mobile device.

4. The server device of claim 1, wherein the mobile device provides selectable tabs for display of types of information, including at least one of a restaurant tab or a people tab.

5. The server device of claim 1, wherein providing the content information to the mobile device further allows the mobile device to superimpose the content information onto a map display.

6. The server device of claim 1, wherein providing the content information to the mobile device further allows the mobile device to display at least some of the content information in an x-ray mode that displays obstructions to reveal what is behind the obstruction in a particular direction.

7. The server device of claim 1, wherein at least some of the content information includes merchant information including a distance and orientation between a merchant and the mobile device.

8. An apparatus comprising a non-transitory computer readable medium, having computer-executable instructions stored thereon, that in response to execution by a mobile device, cause the mobile device to perform operations, comprising:
    sending a geographic position of the mobile device;
    sending a change in an orientational direction of the mobile device from a first direction to a second direction, the orientational direction being determined at least in part using an imaging component of the mobile device;
    performing a search for content information based on the received geographic position and change in orientational direction of the mobile device; and
    displaying the content information at the mobile device.

9. The apparatus of claim 8, wherein at least some of the content information is obtained local to the mobile device.

10. The apparatus of claim 8, wherein performing the search further comprises receiving at least keyword usable to refine the search for content information.

11. The apparatus of claim 8, wherein the content information further includes at least one of a movement, network interaction, purchase, or game activity of a second mobile device.

12. The apparatus of claim 8, wherein the mobile device performs actions, further including: receiving a distance perimeter from the mobile device, usable to limit content information provided to within the distance perimeter.

13. The apparatus of claim 8, wherein displaying the content information further comprises tagging the content information with geographic position information relative to the position and orientational direction of the mobile device.

14. The apparatus of claim 8, wherein performing the search further comprises using a selectable tab for inputting a person's identifier for narrowing a result of the search.

15. The apparatus of claim 8, wherein displaying the content information further includes inhibiting display of at least some of the content information based on a distance between an item within the content information and the mobile device.

16. A mobile device, comprising:
   an imaging component; and
   a processor device that performs actions, including:
      determining a geographic position of the mobile device;
      determining a change in an orientational direction of the mobile device from a first direction to a second direction, the orientational direction being determined at least in part using the imaging component of the mobile device;
      performing a search for content information based on the received geographic position and change in orientational direction of the mobile device; and
      displaying the content information at the mobile device.

17. The mobile device of claim 16, wherein performing the search further includes using a distance perimeter to filter results in the content information.

18. The mobile device of claim 16, wherein displaying the content information includes displaying geographic position information of at least one item within the displayed content information.

19. The mobile device of claim 16, wherein the content information includes merchant information including an orientation between a merchant and the mobile device.

20. The mobile device of claim 16, wherein information about the change of the orientational direction includes information about a third direction that is between the first direction and the second direction, the information about the third direction being used to refine the search for content information.

* * * * *